(12) United States Patent
Lev et al.

(10) Patent No.: US 9,088,120 B2
(45) Date of Patent: Jul. 21, 2015

(54) SERVICEABLE ELECTRICAL CONNECTION AND METHOD

(75) Inventors: Leonid C. Lev, West Bloomfield, MI (US); Nikolay Kondratyev, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 383 days.

(21) Appl. No.: 13/352,779

(22) Filed: Jan. 18, 2012

(65) Prior Publication Data

US 2013/0005196 A1 Jan. 3, 2013

Related U.S. Application Data (60) Provisional application No. 61/501,994, filed on Jun. 28, 2011.

(51) Int. Cl.
*H01R 4/02* (2006.01)
*H01R 4/10* (2006.01)
*H01R 43/02* (2006.01)
(Continued)

(52) U.S. Cl.
CPC ............ *H01R 43/0207* (2013.01); *B23K 20/10* (2013.01); *H01M 2/202* (2013.01); *H01M 2/206* (2013.01); *H01R 4/027* (2013.01); *H01R 4/029* (2013.01); *B23K 2201/38* (2013.01); *H01M 2220/20* (2013.01)

(58) Field of Classification Search
CPC ................................ H01R 4/027; H01R 4/029
USPC .................................................... 439/874, 876
See application file for complete search history.

(56) References Cited

U.S. PATENT DOCUMENTS 5,136,122 A * 8/1992 Kwitkowski et al. ......... 439/887
6,379,839 B1 4/2002 Inoue et al.
7,040,906 B2 * 5/2006 Yamakawa et al. ........... 439/604
(Continued)

FOREIGN PATENT DOCUMENTS

CN 101080359 A 11/2007
CN 102856688 A 1/2013
(Continued)

OTHER PUBLICATIONS

U.S. Appl. No. 13/016,012, filed Jan. 28, 2011, Carlson et al.
(Continued)

*Primary Examiner* — Felix O Figueroa
(74) *Attorney, Agent, or Firm* — Harness, Dickey & Pierce, P.L.C.

(57) ABSTRACT

An electrical connection includes an electrically conductive first contact member, an electrically conductive second contact member, an interface, and an attachment. The first contact member includes a first contact surface for passing current. The second contact member includes a second contact surface for passing current that directly contacts the first contact surface. The interface includes one of a cold weld and a fused section that physically joins the first contact member and the second contact member, and that forms a primary conductive path between the first contact member and the second contact member. The interface is formed by ultrasonic vibration of the first contact surface relative to the second contact surface. The attachment is separate from the interface and mechanically joins the first contact member and the second contact member. A method for forming the electrical method is also provided.

20 Claims, 5 Drawing Sheets

(51) Int. Cl.
*H01M 2/20* (2006.01)
*B23K 20/10* (2006.01)

(56) References Cited

U.S. PATENT DOCUMENTS

| | | |
|---|---|---|
| 2005/0132562 A1 | 6/2005 | Saito et al. |
| 2006/0115323 A1 | 6/2006 | Coppeta et al. |
| 2012/0193331 A1 | 8/2012 | Carlson et al. |
| 2012/0315384 A1 | 12/2012 | Abd Elhamid et al. |

FOREIGN PATENT DOCUMENTS

| | | |
|---|---|---|
| DE | 102012210421 A1 | 1/2013 |
| JP | H11-297373 A | 10/1999 |

OTHER PUBLICATIONS

U.S. Appl. No. 13/154,966, filed Jun. 7, 2011, Abd Elhamid et al.

English language translation of Response to Office Action dated Apr. 3, 2014 issued by the State Intellectual Property Office in Chinese Application No. 201210217246.5 (Pub. No. CN 102856688), as filed on Jul. 11, 2014.

English language summary of Response to Office Action dated Oct. 20, 2014 issued by the State Intellectual Property Office in Chinese Application No. 201210217246.5 (Pub. No. CN 102856688), as filed on Jan. 4, 2015.

* cited by examiner

SERVICEABLE ELECTRICAL CONNECTION AND METHOD

CROSS-REFERENCE TO RELATED APPLICATIONS

This application claims the benefit of U.S. Provisional Application No. 61/501,994, filed on Jun. 28, 2011. The disclosure of the above application is incorporated herein by reference in its entirety.

FIELD

The present disclosure relates to electrical connections and methods of forming the electrical connections, and more particularly, to serviceable electrical connections.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Electrical connections provide for the flow of current between two separate electrically conductive contact members. In some electrical connections, a mechanical connection, such as an electrical connector, joins the contact members. In other electrical connections, a metallurgical connection, such as a fusion weld, joins the contact members. Some mechanical connections offer an advantage that the contact members may be disconnected to service electrical components associated with the contact members. However, such connections may deteriorate over time. For example, an oxide layer may form at an interface between the contact members, creating an area of high resistance. In contrast, metallurgical connections may advantageously inhibit deterioration of the connection, yet also inhibit servicing of associated electrical components. For example, efforts to disconnect or separate the contact members joined by a fusion weld may result in the destruction of all or part of the electrical contact members. Destruction of the electrical contact members may prevent re-use or re-attachment of the contact members and/or the associated electrical components.

SUMMARY

In one form, the present disclosure provides an electrical connection including a first conductive contact member, a second conductive contact member, an interface, and an attachment. The first conductive contact member includes a first contact surface. The second conductive contact member includes a second contact surface that directly contacts the first contact surface. The interface includes one of a cold weld and a fused section that physically joins the first conductive contact member and the second conductive contact member, and that forms a conductive path between the first conductive contact member and the second conductive contact member. The interface is formed by ultrasonic vibration of the first contact surface relative to the second contact surface. The attachment is separate from the interface and mechanically joins the first conductive contact member and the second conductive contact member.

In various features, the interface includes a cold weld and is free of fused sections. In other features, the interface includes both a cold weld and a fused section. In further features, the attachment compresses the interface. In still further features, the attachment mechanically joins the first conductive contact member and the second conductive contact member in an area adjacent the interface. In yet further features, the attachment mechanically joins the first conductive contact member and the second conductive contact member in an area overlapping the interface.

In various features, the attachment is a fastener separate from the first conductive contact member and the second conductive contact member. In alternate features, the attachment includes a seam formed by the first conductive contact member and the second conductive contact member. In further features, the first conductive contact member and the second conductive contact member are composed of different materials. In still further features, the first conductive contact member is a battery lead.

In another form, the present disclosure provides a method for forming an electrical connection. In one example, the method includes engaging a first contact surface of a first conductive contact member with a second contact surface of a second conductive contact member. The method further includes applying pressure to the first contact surface and the second contact surface. The method further includes applying ultrasonic vibration to the first contact surface relative to the second contact surface to form an interface including one of a cold weld and a fused section that physically joins the first conductive contact member and the second conductive contact member and forms a conductive path between the first conductive contact member and the second conductive contact member. The method further includes securing an attachment to the first conductive contact member and the second conductive contact member that mechanically joins the first conductive contact member and the second conductive contact member.

In various features, the method further includes stopping the ultrasonic vibration before forming any fused sections between the first conductive contact member and the second conductive contact member. In alternate features, the method further includes applying ultrasonic vibration to form an interface including both a cold weld and a fused section.

In another example, a method for forming an electrical connection includes engaging a first contact surface of a first conductive contact member with a second contact surface of a second conductive contact member. At least one of the first conductive contact member and the second conductive contact member is a battery lead. The method further includes applying pressure to the first contact surface and the second contact surface. The method further includes applying ultrasonic vibration to the first contact surface relative to the second contact surface until: (a) a conductive path is formed between the first contact surface and the second contact surface, and (b) one of a cold weld and a fused section physically joining the first contact surface and the second contact surface is formed. The method further includes securing an attachment to the first conductive contact member and the second conductive contact member that mechanically joins the first conductive contact member and the second conductive contact member. In various features, the method further includes stopping the ultrasonic vibration before fusing the first conductive contact member and the second conductive contact member.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure provides a serviceable electrical connection and a method of forming the electrical connection. The present disclosure further provides a method of assembling an electrical device including the electrical connection and a method of disassembling the electrical connection. The electrical connection is characterized by low contact resistance, high strength, and relatively easy disassembly when compared with other conventional electrical connections. The electrical connection may be used to join two or more electrically conductive contact members associated with one or more electrical devices. As used herein, a serviceable connection generally refers to a connection that may be partly or wholly disassembled without incurring damage that prevents reuse of any components forming the connection. Serviceable connections may be partly or wholly disassembled to replace, repair, maintain, inspect, ect. one or more components forming the connection and/or electrical devices connected by the connection.

The electrical connection includes a physical interface formed between contact surfaces of the contact members and a mechanical attachment, each physically coupling the contact members. The physical interface further electrically couples the contact members. The physical interface is created by bringing the conductive components into contact and subjecting them to ultrasonic acoustic vibration to remove any non-conductive films or deposits on the contact surfaces. In various implementations more fully described below, the physical interface is one of a cold weld and low-strength fusion weld. As used herein, cold weld generally refers to a physical connection created by a process in which joining occurs without fusion at the interface between the two parts to be joined. A cold weld differs from what may be referred to as a conventional fusion weld in that, during the welding process, no liquid or molten phase is created in the two components to be joined. A cold weld adheres the two electrical components together via attractive inter-molecular forces between contact areas, for example van der Waals forces. In contrast to the cold weld, the low-strength fusion weld includes a low-strength metallurgical bond that joins the two electrical components together. Similar to the cold weld, the metallurgical bond is insufficient to resist expected separation forces. Together, the physical interface and the mechanical attachment provide a structure that can be disassembled, yet is sufficient to resist expected separation forces.

The electrical connection according to the present disclosure is advantageous over other conventional designs. For example, the electrical connection provides an electrically stable interface, yet can be disassembled without physical destruction of the contact members. In this way, the electrical connection improves the serviceability of the electrical connection and electrical components connected to the electrical connection. By enabling servicing of the electrical components, the electrical connection improves the recyclability of assemblies including serviceable electrical components and may reduce overall life-cycle costs of the assemblies.

Figure 1:
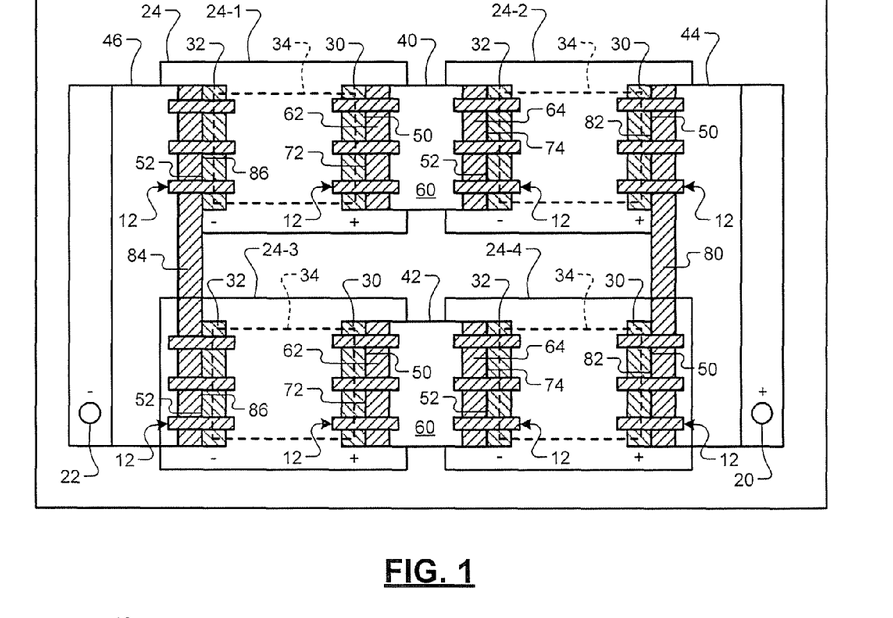
FIG. 1 is a block diagram illustrating a battery pack including an electrical connection according to the present disclosure.

With particular reference to FIG. 1, a block diagram illustrates a battery assembly 10 including electrical connections 12 according to the present disclosure. In various implementations, the battery assembly 10 is a rechargeable lithium-ion battery (LIB) assembly used to power an electric device. While the teachings of the present disclosure are illustrated for an LIB, it is understood that the present teachings may be applied to other battery systems and other electrical devices. According to the present non-limiting example, the LIB assembly 10 is used to power a traction motor of an all-electric or hybrid automotive vehicle. As used herein, traction motor generally refers to an electric motor providing a torque for operating a machine, such as an automotive vehicle. The LIB assembly 10 includes a positive terminal 20, a negative terminal 22, and lithium-ion batteries (LIBs) 24 connected in series and parallel arrangements by the electrical connections 12. The positive and negative terminals 20, 22 connect the battery pack to an electrical system of the vehicle, including the traction motor.

In various implementations, the number and arrangement of the LIBs 24 vary based on various battery parameters, such as a desired voltage, a desired power output, and a desired battery storage. For example, in one automotive application, 288 LIBs 24 provide around three hundred and sixty volts (360 V), sixteen kilowatt-hours of stored energy (16 kWh), and fifty-five kilowatts per hour of power (55 kW/h). For exemplary purposes, the LIB assembly 10 presented includes four (4) LIBs 24-1, 24-2, 24-3, 24-4 connected in series and parallel arrangements. The LIBs 24-1, 24-2, 24-3, 24-4 are substantially similar. Each of the LIBs 24-1, 24-2, 24-3, 24-4 includes a positive lead 30, a negative lead 32, and an electrolyte 34. A bus bar 40 connects the positive lead 30 of the LIB 24-1 to the negative lead 32 of the LIB 24-2, forming a first series arrangement. The bus bar 40 has a U-shaped construction (see FIG. 2) and is composed of copper. A bus bar 42 connects the positive lead of the LIB 24-3 to the negative lead 32 of the LIB 24-4, forming a second series arrangement. A bus bar 44 connects the positive leads of the LIBs 24-2, 24-4 to the positive terminal 20 and a bus bar 46 connects the negative leads of the LIBs 24-1, 24-3 to the negative terminal 22.

Figures 2, 3:
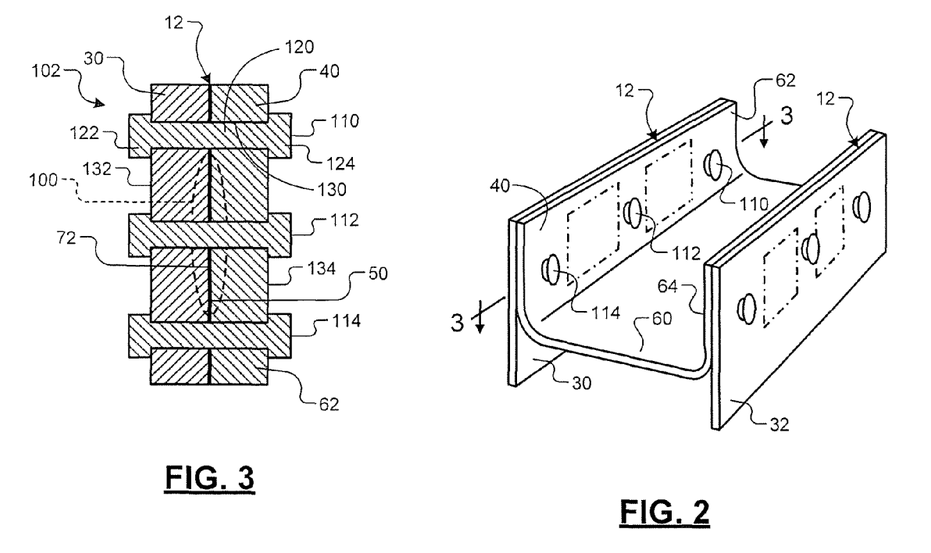
FIG. 2 is a fragmentary perspective view illustrating an electrical connection according to the present disclosure.
FIG. 3 is a schematic cross-sectional view of the electrical connection taken along line 3-3 of FIG. 2.

With additional reference to FIG. 2, the positive leads 30 have a generally flat or planar construction and are composed of copper or other suitable conductive material (e.g., metal). Each positive lead 30 includes a contact surface 50 that directly contacts the adjoining component bus bars 40, 42, 44. The negative leads 32 have a generally flat or planar construction and are composed of aluminum or other suitable conductive material. Each negative lead 32 includes a contact surface 52 that directly contacts the adjoining bus bars 40, 42, 46. In various implementations, the positive leads 30 and the negative leads 32 are composed of materials other than copper and aluminum based on the chemistry of the electrolyte 34. The bus bars 40, 42 are substantially similar and composed of copper. Each of the bus bars 40, 42 has a generally U-shaped section including a base wall 60 and side walls 62, 64 extending from the base wall 60. Each side wall 62 includes a contact surface 72 that directly contacts the contact surface 50 of the positive leads 30 of the adjoining LIBs 24-1, 24-3. Each side wall 64 includes a contact surface 74 that directly contacts the contact surface 52 of the negative leads 32 of the adjoining LIBs 24-2, 24-4. The bus bar 44 includes a side wall 80 including a contact surface 82 that directly contacts the contact surface 50 of the positive leads 30 of the adjoining LIBs 24-2, 24-4. The bus bar 46 includes a side wall 84 including a contact surface 86 that directly contacts the contact surface 52 of the negative leads 32 of the adjoining LIBs 24-1, 24-3. In various implementations, the bus bars 40, 42, 44, 46 are composed of materials other than copper, based on the composition of the positive and negative leads 30, 32.

The electrical connections 12 form electrical connections between the various components of the LIB assembly 10. For purposes of illustrating the present teachings, features of the electrical connection 12 between the positive lead 30 and the bus bar 40 will be described in detail. It will be understood that the following description applies equally to the remaining electrical connections 12, unless otherwise noted. With additional reference to FIG. 3, a schematic cross-sectional view illustrates the electrical connection 12 between the positive lead 30 and the bus bar 40. The electrical connection 12 includes a physical interface 100 and a mechanical attachment 102. Together, the physical interface 100 and the mechanical attachment 102 form an electrical connection which can be disassembled without destructive methods and which is strong enough to resist external tensile loads, moment loads, and shear loads, or a combination thereof. The physical interface 100 is formed in a region of intimate contact between the contact surfaces 50, 72, and physically and electrically couples the positive lead 30 to the bus bar 40. The physical interface 100 forms a primary conductive path between the positive lead 30 and the bus bar 40. The physical interface 100 further forms a first structure for resisting separation loads that can be disassembled without incurring extensive damage to the positive lead 30 and the bus bar 40.

In one example, the physical interface 100 includes a cold weld formed by attractive inter-molecular forces between the positive lead 30 and the bus bar 40. The attractive inter-molecular forces between the contact surfaces 50, 72 form a structure that physically couples the positive lead 30 and the bus bar 40, and resists separation loads. In another example, the physical interface 100 alternately or additionally includes a fused section formed by localized melting and re-solidification of the positive lead 30 and the bus bar 40 at the contact surfaces 50, 72. The fused section forms a structure that metallurgically joins the positive lead 30 and the bus bar 40. The fused section resists separation loads and has a strength sufficiently low to allow disassembly by an external force applied for that purpose, without causing damage that prevents re-use of the positive lead 30 or the bus bar 40. In various implementations, the interface 100 is substantially free of fused sections or, in other words, any fused sections present provide less than five percent of the strength of the interface 100.

According to the present disclosure, the physical interface 100 is created using ultrasonic vibration. More specifically, ultrasonic vibration is locally applied between the positive lead 30 and the bus bar 40 while the contact surfaces 50, 72 are pressed together. The ultrasonic vibration removes oxide films and other deposits from the contact surfaces 50, 72, exposing nascent metal and providing intimate contact between the contact surfaces 50, 72. The intimate contact provides the physical interface 100 with a suitably low contact resistance and, in various implementations, creates attractive inter-molecular forces and/or fused sections that physically couple the positive lead 30 and the bus bar 40. In contrast to conventional ultrasonic vibration processes used to weld two parts together, the ultrasonic vibration is applied at pressures and/or durations designed to prevent the formation of metallurgical bonds that alone are capable of resisting expected separation forces. In various aspects, the pressures and/or durations are less than those used to weld two parts together. For an example only, for producing 40 millimeter (mm) wide by 45 mm long welds joining three 0.2 mm Nickel coated copper sheets with a 0.9 mm Nickel coated copper plate using a tool having three weld pads, the pressure may be between approximately 40 pounds per square inch (psi) and approximately 60 psi, inclusive. For the above example, the duration may be between approximately 0.3 seconds and 0.8 seconds, inclusive. The pressure and/or duration used may vary based on, for example, the materials being joined together, sizes of the contacts and the connection areas, and geometry of the contacts.

The mechanical attachment 102 engages and thereby mechanically joins the positive lead 30 and the bus bar 40. The mechanical attachment 102 forms a second structure providing additional strength to the electrical connection 12 for resisting external tensile loads, moment loads, and shear loads that would otherwise result in separation of the physical interface 100 alone. The mechanical attachment 102 may form a primary structure for resisting separation loads. For example, the mechanical attachment 102 may absorb between fifty and ninety percent of the separation loads, including all sub-ranges. In various implementations, the mechanical attachment 102 compresses the positive lead 30 and the bus bar 40. The mechanical attachment 102 may be disposed adjacent the physical interface 100 and/or intersect or overlap the physical interface 100. According to the present non-limiting example, the mechanical attachment 102 includes three plastic rivets 110, 112, 114. While three rivets 110, 112, 114 are provided, in various implementations, fewer or more rivets may be provided as desired. Additionally, the rivets 110, 112, 114 may be composed of materials other than a plastic, such as a metal.

The rivets 110, 114 are disposed adjacent the physical interface 100 and the rivet 112 extends through the physical interface 100. The rivets 110, 112, 114 each include a shaft 120, a head end 122, and a tail end 124. The shafts 120 engage complementary bores 130 formed in the positive lead 30 and the bus bar 40. The head ends 122 and tail ends 124 engage outer surfaces of the positive lead 30 and the bus bar 40 opposite the contact surfaces 50, 72. For exemplary purposes, the head ends 122 engage an outer surface 132 of the positive lead 30 opposite the contact surface 50 and the tail ends 124 engage an outer surface 134 of the bus bar 40 opposite the contact surface 72. To disassemble the electrical connection 12, rivets 110, 112, 114 are removed by various methods. In one method, the rivets 110, 112, 114 are drilled out using a drill bit having a diameter less than or equal to that of the bores 130. In another method, heat is applied to melt and thereby remove the rivets 110, 112, 114.

Figure 4:
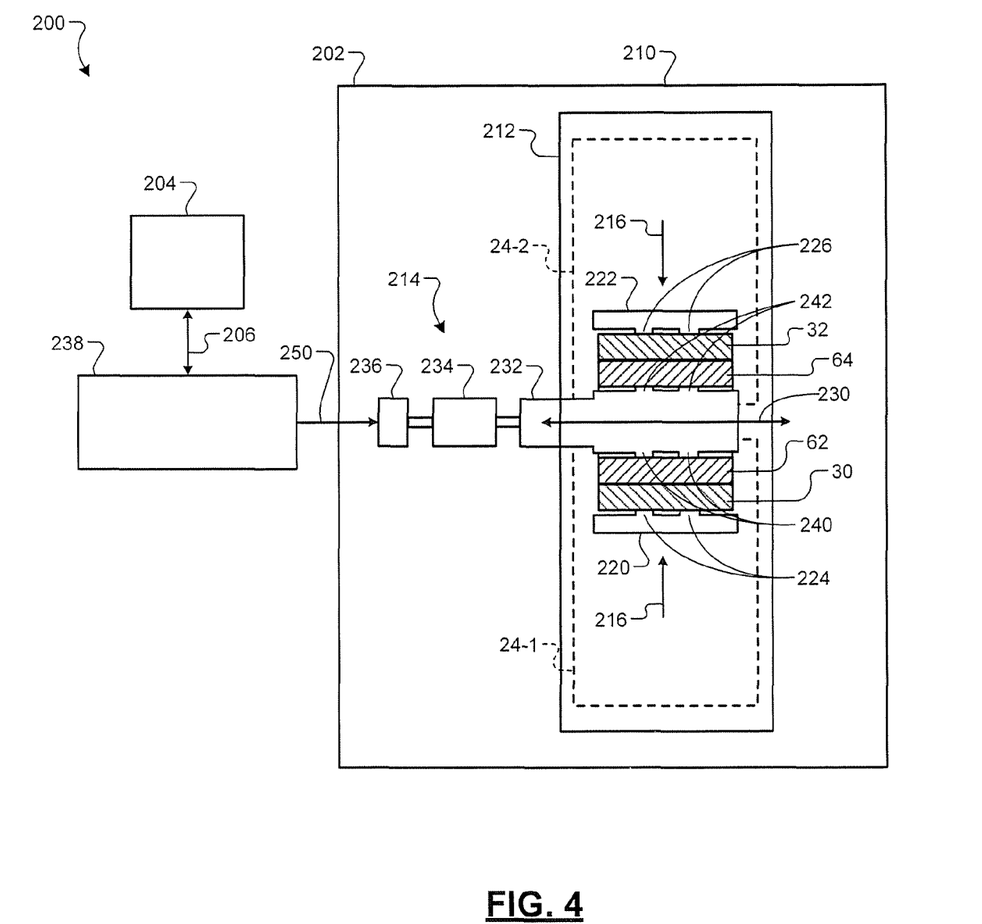
FIG. 4 is a block diagram illustrating an exemplary apparatus for forming an electrical connection according to the present disclosure.

With particular reference to FIG. 4, a block diagram illustrates an exemplary apparatus 200 for forming an electrical connection according to the present disclosure. For exemplary purposes, the apparatus 200 will be described with reference to the electrical connections 12 formed between the LIBs 24-1, 24-2 and the bus bar 40. The apparatus 200 includes a vibration apparatus 202 controlled by a control module 204 via various control signals 206. The vibration apparatus 202 is configured to fixture the electrical components to be joined and locally apply ultrasonic vibration to the electrical components.

The vibration apparatus 202 includes an enclosure 210, a press 212, and a lateral drive system 214. The enclosure 210 is configured to receive and house the LIBs 24-1, 24-2, along with various components of the vibration apparatus 202, including the press 212 and the lateral drive system 214. The enclosure 210 provides a suitable processing environment for forming the electrical connection 12. In various implementations, the enclosure 210 provides a temperature-controlled, humidity-controlled, and pressure-controlled processing environment.

The press 212 is configured to fix positions of the LIBs 24-1, 24-2 relative to the lateral drive system 214 and apply a compressive force to the positive lead 30, the negative lead 32, and the bus bar 40 for forming the physical interfaces 100 of the electrical connections 12. A magnitude of the compressive force is specified by control values received from the control module 204 via the control signals 206. A direction of the compressive force is illustrated by the arrows identified by reference numeral 216. The press 212 includes anvils 220, 222. The anvil 220 and the anvil 222 move into and out of engagement with the positive lead 30 and the negative lead 32, respectively, based on control values received from the control module 204 in the control signals 206. The anvil 220 includes one or more engagement members 224 that engage and press against the outer surface 132 of the positive lead 30. The anvil 222 includes engagement members 226 that engage and press against an outer surface of the negative lead 32 opposite the contact surface 52.

The lateral drive system 214 is configured to apply localized ultrasonic vibration to the bus bar 40 relative to the positive and negative leads 30, 32. More specifically, the lateral drive system 214 is configured to position and move the bus bar 40 relative to the positive and negative leads 30, 32 in one or more directions transverse to the compressive force. According to the present non-limiting example, the lateral drive system 214 is configured to linearly move the bus bar 40 relative to the positive and negative leads 30, 32. A direction of the relative linear movement is illustrated by the arrows identified by reference numeral 230.

The lateral drive system 214 includes a sonotrode or horn 232, an optional booster 234, a piezoelectric transducer 236, and a power supply 238. The horn 232 includes engagement members 240, 242 that engage the walls 62, 64 of the bus bar 40 and oppose the compressive force exerted by the anvils 220, 222. The engagement members 240, 242 cooperate with the engagement members 224, 226 to focus the ultrasonic vibration to an area selected for the physical interface 100. The booster 234 is configured to modify an amplitude of ultrasonic vibration received from the transducer based on control values received from the control module 204 in the control signals 206. The booster 234 transmits the modified ultrasonic vibration to the horn 232. In various implementations, the booster 234 is integrated with the horn 232 in a single unit. In alternate implementations, the booster 234 is omitted. The piezoelectric transducer 236 converts an alternating current (AC) signal 250 received from the power supply 238 to the mechanical vibration that is transmitted to the booster 234 and, ultimately, the bus bar 40 and the positive and negative leads 30, 32. The power supply 238 generates the AC signal 250 at a frequency and an amplitude that are based on control values received from the control module 204 via the control signals 206.

The control module 204 controls operation of the press 212 and the lateral drive system 214. More specifically, the control module 204 moves the anvils 220, 222 into and out of engagement with the positive and negative leads 30, 32 and controls the compressive force transmitted by the anvils 220, 222. The control module 204 further controls the delivery of the ultrasonic vibration. More specifically, the control module 204 specifies various parameters of the ultrasonic vibration including but not limited to, a frequency, an amplitude, an energy, and a duration. The various parameters can be different for each of the electrical connections 12 and can be predetermined through testing during a design and/or manufacturing validation phase. For an example only, for producing 40 millimeter (mm) wide by 45 mm long welds joining three 0.2 mm Nickel coated copper sheets with a 0.9 mm Nickel coated copper plate using a tool having three weld pads, the pressure may be between approximately 40 pounds per square inch (psi) and approximately 60 psi, inclusive. For the above example, the duration may be between approximately 0.3 seconds and 0.8 seconds, inclusive, the amplitude may be between approximately 40μ and approximately 60μ, inclusive, and the energy may be between 600 Joules (J) and 1400 J, inclusive. The pressure, frequency, energy, and/or duration used may vary based on, for example, the materials being joined together, sizes of the contacts and the connection areas, and geometry of the contacts.

With continued reference to FIG. 4, operation of the apparatus 200 will now be described in further detail. Operation begins by positioning the bus bar 40 on the horn 232 and positioning the LIBs 24-1, 24-2 within the press 212. After the bus bar 40 and the LIBs 24-1, 24-2 are positioned, the press 212 engages the anvils 220, 222 with the positive and negative leads 30, 32 and presses the positive and negative leads 30, 32 into engagement with the bus bar 40. The press 212 engages the positive and negative leads 30, 32 with the bus bar 40 and generates the magnitude of compressive force specified by the control module 204.

Once the specified compressive force is achieved, the lateral drive system 214 begins vibrating the bus bar 40 for the duration specified by the control module 204. the lateral drive system moves the bus bar 40 relative to the positive and negative leads 30, 32 at the frequency and the amplitude specified by the control module 204. The vibration removes and disperses oxides and other deposits on the contact surfaces 50, 52, 72, 74, exposing underlying metal. Further vibration of the exposed metal surfaces forms the physical interface 100 between the positive lead 30 and the bus bar 40 and the physical interface 100 between the negative lead 32 and the bus bar 40.

In various implementations, further vibration of the nascent metal causes gouging between the contact surfaces 50, 72 and/or between the contact surfaces 52, 74. In various implementations, further vibration causes melting of the nascent metal, resulting in the formation of fused sections. However, the fused sections are insufficient alone to resist expected separation forces. Following vibration of the bus bar 40, the mechanical attachments 102 for joining the positive and negative leads 30, 32 to the bus bar 40 are secured. More specifically, the rivets 110, 112, 114 are secured by positioning the rivets 110, 112, 114 within the bores 130 and staking the rivets 110, 112, 114. Staking increases a diameter of the shafts 120 and forms the tail ends 124. The bores 130 can be formed prior to beginning assembly of the electrical connection 12 (i.e., preformed) or during the assembly of the electrical connection 12.

Figure 5:
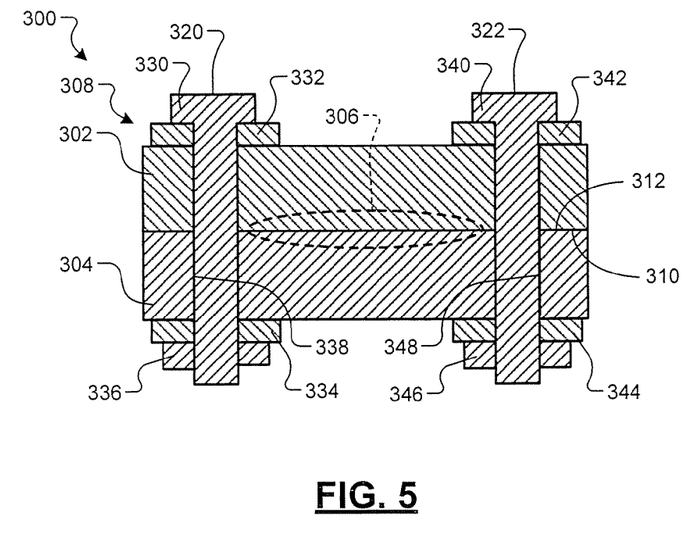
FIG. 5 is a schematic cross-sectional view illustrating another electrical connection according to the present disclosure.

FIG. 5 is a schematic cross-sectional view illustrating another electrical connection 300 for joining a first contact member 302 and a second contact member 304 according to the present disclosure. The electrical connection 300 includes a physical interface 306 and a mechanical attachment 308. The physical interface 306 is formed between complementary contact surfaces 310, 312 of the first and second contact members 302, 304, respectively. The physical interface 306 is similar to the physical interface 100 discussed above. The mechanical attachment 308 includes bolted connections 320, 322 that produce clamping forces, inducing compression in the first and second contact members 302, 304. The clamping force assists the physical interface 100 in resisting separation forces. In various implementations, the bolted connections 320, 322 are electrically conductive and form secondary conductive paths between the first and second contact members 302, 304.

The bolted connections 320, 322 are disposed at opposite ends of the electrical connection 300 adjacent the physical interface 306 as shown. The bolted connection 320 includes a bolt 330, optional washers 332, 334, and a nut 336. The bolt 330 extends through a bore 338 formed through the first and second contact members 302, 304. In various implementations, the bore 338 is disposed adjacent the physical interface 100 on one side of the electrical connection 300. The washers 332, 334 are received on the bolt 330. The nut 336 threadingly engages the bolt 330 and is torqued to create tension in the bolt 330. Tension in the bolt 330 creates a first clamping force compressing the first and second contact members 302, 304. The bolted connection 322 includes a bolt 340, optional washers 342, 344, and a nut 346. The bolt 340 extends through a bore 348 formed through the first and second contact members 302, 304. The washers 342, 344 are received on the bolt 340. The nut 346 threadingly engages the bolt 340 and is torqued to create tension in the bolt 340. Tension in the bolt 340 creates a second clamping force compressing the first and second contact members 302, 304.

The electrical connection 300 may be disassembled and reassembled to service the contact members 302, 304 and/or electrical components connected by the electrical connection 300. For example, the electrical connection 300 may be disassembled to replace, repair, maintain, inspect, etc. one or more components. To disassemble the electrical connection 300, the nuts 336, 346 are unthreaded and the bolts 320, 322 and washers 334, 344 are removed. To re-assemble the electrical connection 300, the bolted connections 320, 322 are re-secured as discussed above.

Figure 6:
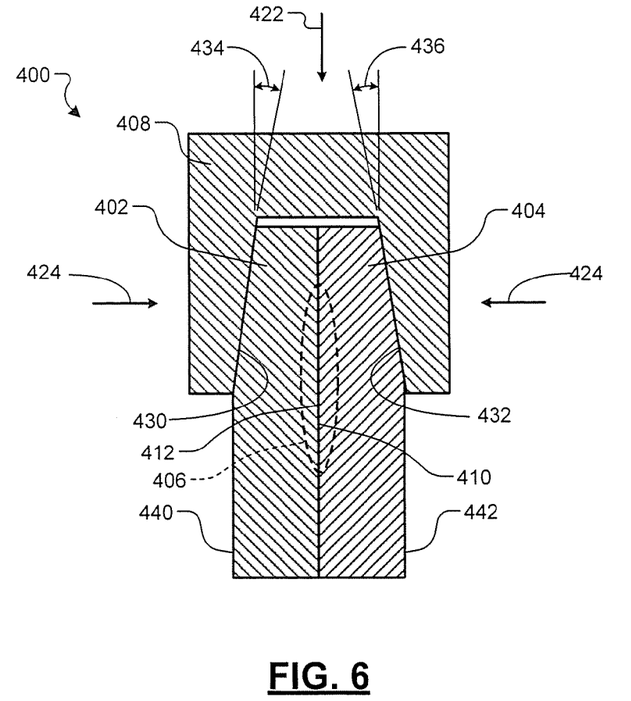
FIG. 6 is a schematic cross-sectional view illustrating another electrical connection according to the present disclosure.

FIG. 6 is a schematic cross-sectional view illustrating another electrical connection 400 for joining a first contact member 402 and a second contact member 404 according to the present disclosure. The electrical connection 400 includes an physical interface 406 and a mechanical attachment in the form of a clip 408. The physical interface 406 is formed between complementary contact surfaces 410, 412 of the first and second contact members 402, 404, respectively. The physical interface 406 is similar to the physical interface 100 discussed above. The clip 408 is received on the first and second contact members 402, 404 in a direction indicated by arrow 422. The clip 408 frictionally engages the first and second contact members 402, 404 in a press-fit and creates a clamping force indicated by the arrows 424. The clamping force assists in retaining the clip 408 and resisting separation forces. The clip 408 includes tapered walls 430, 432 that form angles 434, 436 with respect to outer surfaces 440, 442 of the first and second contact members 402, 404. The electrical connection 300 is formed by creating the physical interface 406 between the first and second contact members 402, 404 and subsequently pressing the clip 408 on the first and second contact members 402, 404.

The electrical connection 400 may be disassembled and reassembled to service the contact members 402, 404 and/or electrical components connected by the electrical connection 400. For example, the electrical connection 400 may be disassembled to replace, repair, maintain, inspect, etc. one or more components. To disassemble the electrical connection 400, the clip 408 is removed by applying a force in a direction opposite to the direction 422 in which it is received. To re-assemble the electrical connection, the clip 408 may be secured by pressing the clip 408 in the direction 422 in which it is received.

Figure 7:
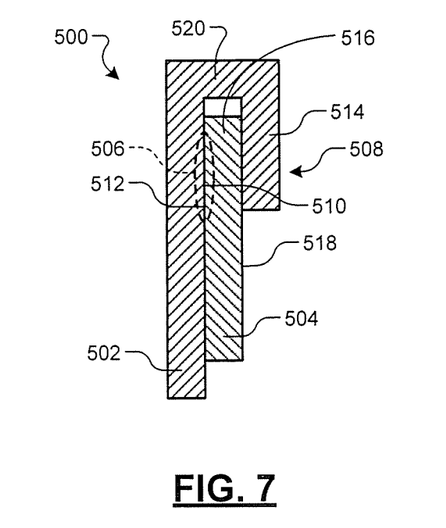
FIG. 7 is a schematic cross-sectional view illustrating another electrical connection according to the present disclosure.

FIG. 7 is a schematic cross-sectional view illustrating another electrical connection 500 for joining a first contact member 502 and a second contact member 504 according to the present disclosure. The electrical connection 500 includes an physical interface 506 and a mechanical attachment in the form of a seam 508. The physical interface 506 is formed between complementary contact surfaces 510, 512 of the first and second contact members 502, 504. The physical interface 506 is similar to the physical interface 100 and can be formed in a similar manner. The seam 508 is formed by folding an end portion 514 of the first contact member 502 around an end portion 516 of the second contact member 504 and engaging the end portion 514 with an outer surface 518 of the second contact member 504 opposite the contact surface 510. The seam 508 forms a one hundred and eighty degree (180°) bend 520 in the end portion 514. In various implementations, a contact area between the end portion 516 and the outer surface 518 overlaps all or a part of a contact area of the physical interface 100. The seam 508 resists separation forces and can be unfolded to disassemble the electrical connection 500 and re-folded when re-forming the electrical connection 500. In this way, the seam 508 permits servicing of the contact members 502, 504 and associated electrical components for various purposes including, for example, replacement, repair, maintenance, inspection, etc. The seam 508 may be an open seam or a closed seam. As used herein, open seam generally refers to a seam in which there is a cavity or air pocket disposed within a bend forming the seam. Closed seam generally refers to a seam in which the bend or bends forming the seam are free of air pockets.

Figure 8:
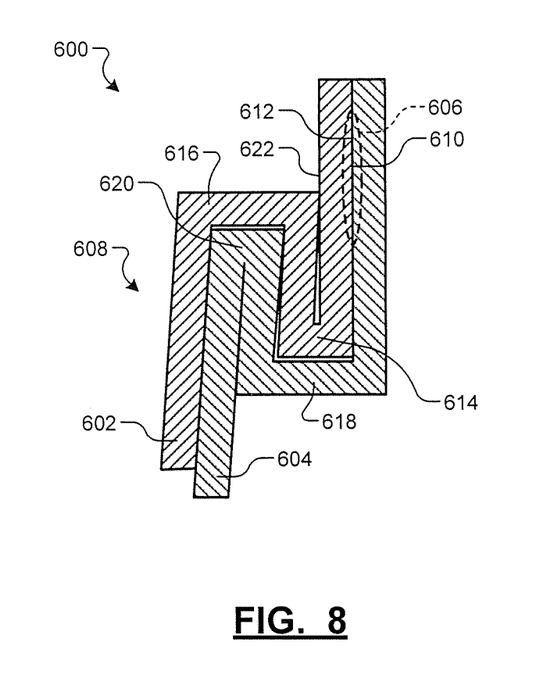
FIG. 8 is a schematic cross-sectional view illustrating another electrical connection according to the present disclosure.

FIG. 8 is a schematic cross-sectional view illustrating another electrical connection 600 for joining a first contact member 602 and a second contact member 604 according to the present disclosure. The electrical connection 600 includes an physical interface 606 and a mechanical attachment in the form of a double seam 608. The physical interface 606 is formed between complementary contact surfaces 610, 612 of the first and second contact members 602, 604. The physical interface 606 is similar to the physical interface 100 and can be formed in a similar manner.

The seam 608 is formed by forming bends 614, 616 in the first contact member 602 and bends 618, 620 in the second contact member 604 and pressing the bends 614, 616, 618, 620 into engagement in an interleaved arrangement as shown. The bends 614, 616, 618, 620 each are one hundred and eighty degree bends (180°). In various implementations, the bends 616, 618 engage an outer surface 622 of the first contact member in a contact area that overlaps all or part of a contact area of the physical interface 606. The seam 608 resists separation forces and can be unfolded to disassemble the electrical connection 600 and re-folded when reforming the electrical connection 600. In this way, the seam 608 permits servicing of the contact members 602, 604 and associated electrical components for various purposes including, for example, replacement, repair, maintenance, inspection, etc. In various implementations, the seam 608 is formed at ends of the first and second contact members 602, 604. In alternate implementations, the seam 608 is formed between the physical interface 606 and ends of the first and second contact members 602, 604 connected with an associated electrical device.

Figure 9:
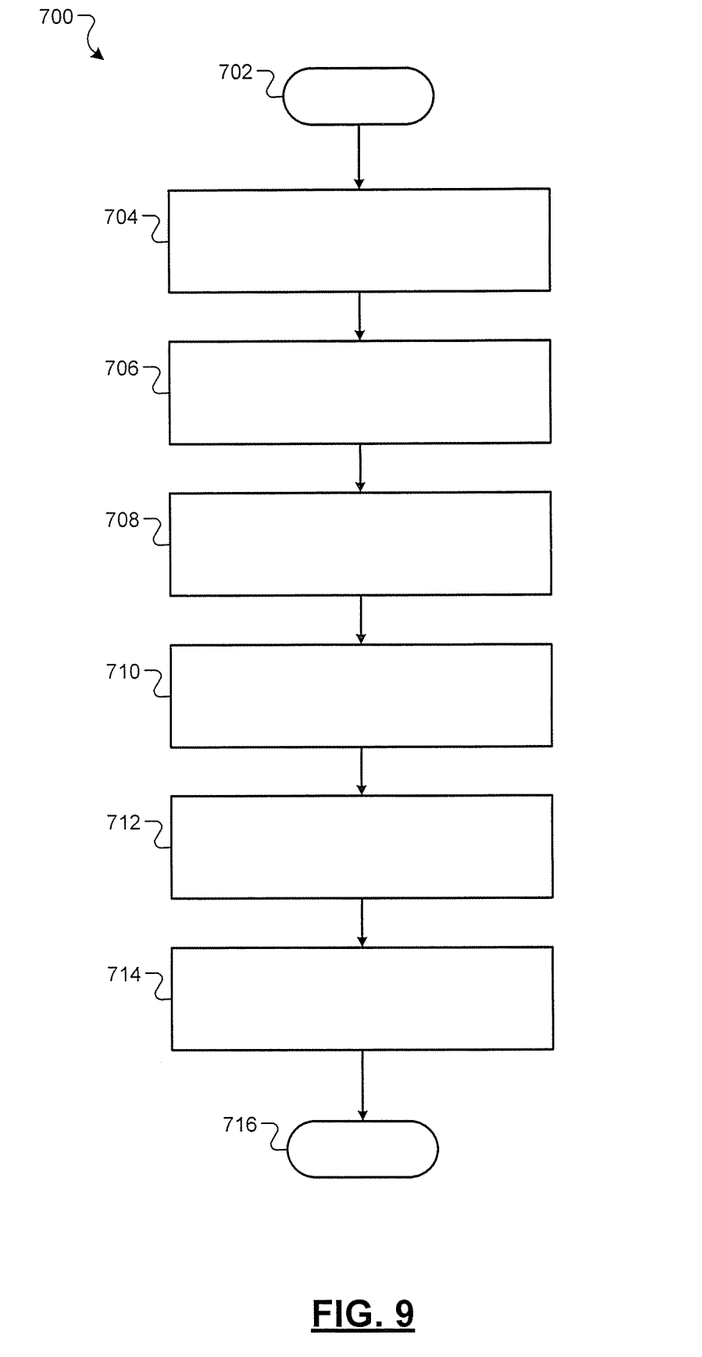
FIG. 9 is a flow diagram illustrating an exemplary method for forming an electrical connection according to the present disclosure.

FIG. 9 is a flow diagram illustrating an exemplary method 700 for forming an electrical connection between two electrically-conductive contact members according to the present disclosure. The method 700 may be implemented by one or more apparatuses, such as the apparatus 200 described above. The method 700 may be used to form an electrical connection between contact members composed similar or different materials. The method 700 may be used to form an electrical connection having low contact resistance and suitable for use in a variety of applications.

A start of the method 700 is indicated at 702. At 704, contact surfaces of the first and second contact members to be joined are cleaned using a cleaning solution or other suitable cleaner to remove any contaminants other than oxides and other deposits removed at a later step. For example, grease and other oily deposits may be removed from the contact surfaces using a degreaser. In various implementations, cleaning at 704 may be omitted. At 706, the contact surfaces are brought into contact by engaging the first contact member and the second contact member. At 708, a pressure is applied to the contact surfaces by applying a compressive force to the first and second contact members. For an example only, for producing 40 millimeter (mm) wide by 45 mm long welds joining three 0.2 mm Nickel coated copper sheets with a 0.9 mm Nickel coated copper plate using a tool having three weld pads, the pressure may be between approximately 40 pounds per square inch (psi) and approximately 60 psi, inclusive.

At 710, oxides and other deposits on the contact surfaces are removed by applying ultrasonic vibrations to the first and second contact members for a period while the pressure is applied. Vibration of the contact surfaces removes and disperses the deposits from the contact surfaces. At 712, a physical interface between the contact surfaces is formed by continuing the ultrasonic vibrations for an additional period while the pressure is applied. In various implementations, the physical interface is a cold weld. The cold weld, in contrast to a conventional fusion weld, physically couples the contact surfaces via attractive inter-molecular forces, and does not include a fused section. In various implementations, the physical interface alternately or additionally includes a fused section that metallurgically joins the contact surfaces. Relative to a conventional fused weld, the fused section, when formed, provides the electrical connection with less strength and is insufficient alone to resist expected separation forces.

At 714, a mechanical attachment is secured to the first and second contact members. The mechanical attachment provides a primary structure for resisting separation forces that would otherwise overcome the attractive forces of the cold weld and/or the strength of the fused section formed at the physical interface between the contact surfaces. In various implementations, the mechanical attachment applies a pressure at the physical interface. In various implementations, the mechanical attachment is positioned to overlap the physical interface and/or adjacent the physical interface. The mechanical attachment may include a rivet, a bolted connection, a clip, a hem, or other fasteners suitable for mechanically joining the first and second contact members. An end of the method 700 is designated at 716.

As illustrated above, the present disclosure provides a serviceable electrical connection between two contact members that includes an interface formed by applying ultrasonic vibration between the contact members, and a mechanical attachment. The interface physically couples the two contact members and forms a primary conductive path. During physical testing, interfaces formed according to the present disclosure achieved contact resistances of less than two millionths of an ohm (i.e., <2.0E-6Ω) and, more particularly, between one point six and one point eight millionths of an ohm. The contact resistances were three orders of magnitude lower than the internal resistance of the contact members. The interfaces further required between five hundred newtons (500 N) and six hundred newtons (600 N), and more particularly, between five hundred and thirty-nine newtons (539 N) and five hundred and sixty-seven newtons (567 N) of force to separate.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An electrical connection, comprising:
an electrically conductive first contact member that includes a first contact surface for passing current;
an electrically conductive second contact member that includes a second contact surface for passing current, wherein the second contact surface directly contacts the first contact surface;
an interface including one of a cold weld and a fused section that physically joins the first contact member and the second contact member and forms a primary conductive path between the first contact member and the second contact member, wherein the interface is formed by ultrasonic vibration of the first contact surface relative to the second contact surface; and
a mechanical attachment separate from the interface that mechanically joins the first contact member and the second contact member, wherein the first contact member, the second contact member, the interface, and the mechanical attachment together form the electrical connection, wherein the electrical connection is serviceable and capable of being disassembled and reassembled without causing any damage that would prevent reuse of the electrical connection.

2. The electrical connection of claim 1, wherein the interface includes the cold weld and is free of fused sections.

3. The electrical connection of claim 1, wherein the interface includes both the cold weld and the fused section.

4. The electrical connection of claim 1, wherein the mechanical attachment compresses the interface.

5. The electrical connection of claim 1, wherein the mechanical attachment mechanically joins the first contact member and the second contact member in an area adjacent the interface.

6. The electrical connection of claim 1, wherein the mechanical attachment mechanically joins the first contact member and the second contact member in an area overlapping the interface.

7. The electrical connection of claim 1, wherein the mechanical attachment is a fastener separate from the first contact member and the second contact member.

8. The electrical connection of claim 1, wherein the mechanical attachment includes a seam formed by the first contact member and the second contact member.

9. The electrical connection of claim 1, wherein the first contact member and the second contact member are composed of different materials.

10. The electrical connection of claim 1, wherein the first contact member is a battery lead.

11. A method for forming an electrical connection, comprising:
engaging a first contact surface of an electrically conductive first contact member with a second contact surface of an electrically conductive second contact member;
applying pressure to the first contact surface and the second contact surface;
applying ultrasonic vibration to the first contact surface relative to the second contact surface to form an interface including one of a cold weld and a fused section that physically joins the first contact member and the second contact member and forms a primary conductive path between the first contact member and the second contact member; and
securing a mechanical attachment to the first contact member and the second contact member that mechanically joins the first contact member and the second contact member, wherein the first contact member, the second contact member, the interface, and the mechanical attachment together form the electrical connection, wherein the electrical connection is serviceable and capable of being disassembled and reassembled without causing any damage that would prevent reuse of the electrical connection.

12. The method of claim 11, further comprising stopping the ultrasonic vibration before forming any fused sections between the first contact member and the second contact member.

13. The method of claim 11, further comprising applying ultrasonic vibration to form the interface including both a cold weld and a fused section.

14. The method of claim 11, wherein the mechanical attachment compresses the interface when secured.

15. The method of claim 11, wherein the mechanical attachment mechanically joins the first contact member and the second contact member in an area adjacent the interface when secured.

16. The method of claim 11, wherein the mechanical attachment mechanically joins the first contact member and the second contact member in an area overlapping the interface when secured.

17. The method of claim 11, wherein the mechanical attachment is a fastener separate from the first contact member and the second contact member.

18. The method of claim 11, wherein the first contact member is a battery lead.

19. A method for forming an electrical connection in a battery, comprising:
engaging a first contact surface of an electrically conductive first contact member with a second contact surface of an electrically conductive second contact member, wherein at least one of the first contact member and the second contact member is a battery lead;
applying pressure to the first contact surface and the second contact surface;
applying ultrasonic vibration to the first contact surface relative to the second contact surface until:
a primary conductive path is formed between the first contact surface and the second contact surface, and
one of a cold weld and a fused section physically joining the first contact surface and the second contact surface is formed; and
securing a mechanical attachment to the first contact member and the second contact member that mechanically joins the first contact member and the second contact member, wherein the first contact member, the second contact member, one of the cold weld and the fused section, and the mechanical attachment together form the electrical connection, wherein the electrical connection is serviceable and capable of being disassembled and reassembled without causing any damage that would prevent reuse of the electrical connection.

20. The method of claim 19, further comprising stopping the ultrasonic vibration before fusing the first contact member and the second contact member.

* * * * *